United States Patent
Badwal et al.

(10) Patent No.: US 9,378,410 B1
(45) Date of Patent: Jun. 28, 2016

(54) FACILITATING LEGAL APPROVAL OF DIGITAL IMAGES

(71) Applicant: International Business Machines Corporation, Armonk, NY (US)

(72) Inventors: Herman S. Badwal, Markham (CA); Miran Badzak, Reading, MA (US); Robert Retchless, North York (CA); Fariz Saracevic, Research Triangle Park, NC (US); Lauren H. Schaefer, Newark, DE (US); Chris N. Taylor, Newmarket (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/570,749

(22) Filed: Dec. 15, 2014

(51) Int. Cl.
  *G06K 9/00* (2006.01)
  *G06F 21/32* (2013.01)

(52) U.S. Cl.
  CPC ............ *G06K 9/00288* (2013.01); *G06F 21/32* (2013.01)

(58) Field of Classification Search
  None
  See application file for complete search history.

(56) References Cited

U.S. PATENT DOCUMENTS

| | | | |
|---|---|---|---|
| 5,991,429 A | 11/1999 | Coffin et al. | |
| 6,038,333 A | 3/2000 | Wang | |
| 2004/0246360 A1* | 12/2004 | Stavely | H04N 5/23293 348/333.11 |
| 2007/0220267 A1 | 9/2007 | Inoue et al. | |
| 2010/0080410 A1* | 4/2010 | Deluca | G06F 21/6245 382/100 |
| 2012/0250951 A1* | 10/2012 | Chen | G06F 21/6245 382/118 |
| 2014/0379598 A1* | 12/2014 | Perrone | G06Q 10/103 705/319 |
| 2015/0066637 A1* | 3/2015 | Herrera | G06Q 30/0267 705/14.45 |

OTHER PUBLICATIONS

Anonymously; "Method and Apparatus for Mobile Identity Authentication"; An IP.com Prior Art Database Technical Disclosure; http://ip.com/IPCOM/000194545D; Mar. 29, 2010. 71 pgs.

Anonymously; "System and Apparatus of Multi-person Screen Sharing Based on 3D Multi-person Multi-angel Fast Face Recognition Algorithm"; An IP.com Prior Art Database Technical Disclosure; http://ip.com/IPCOM/000203470D; Jan. 26, 2011. 34 pgs.

Anonymously; "System and Method of Multi-person 2D Multi-angel Fast Face Recognition"; An IP.com Prior Art Database Technical Disclosure; http://ip.com/IPCOM/000203089D; Jan. 19, 2011. 23 pgs.

* cited by examiner

*Primary Examiner* — Stephen R Koziol
*Assistant Examiner* — Delomia L Gilliard
(74) *Attorney, Agent, or Firm* — Cantor Colburn LLP; Daniel Simek

(57) ABSTRACT

In one embodiment, a computer-implemented method includes identifying one or more subjects appearing in an image captured by a mobile device. One or more approval statuses are determined, and an approval status is associated with each of the one or more subjects appearing in the image. Determining the one or more approval statuses includes searching, by a computer processor of the mobile device, within stored data for a blanket approval status applicable to the image for each subject in the image. A blanket approval status specifies an approval status to be applied for images captured in certain circumstances. The one or more approval statuses of the one or more subjects are displaying in association with the image, on the mobile device. It is determined whether the image is approved for publication based on the one or more approval statuses of the one or more subjects in the image.

20 Claims, 5 Drawing Sheets

FACILITATING LEGAL APPROVAL OF DIGITAL IMAGES

BACKGROUND

Various embodiments of this disclosure relate to digital images and, more particularly, to facilitating legal approval of digital images.

In some environments, before posting a photograph of a person, approval is needed from that person. This may be the case, for example, in business environments or when the photo is to be posted publicly on blogs or social media sites. Acquiring these approvals can become complicated, especially when many people appear in the photo or when the photographer does not know the people in the photo.

A conventional method of handling this problem is to manually get written permission from each photo subject after taking the photo. This process can include (1) capturing the photo; (2) showing the photo to each subject of the photo; and (3) requesting each subjects name and written permission to post the photo. This method leaves large room for error, and errors can be costly. If a photo is uploaded without the approval of even a single subject, the person who uploaded it, or an organization associated with that person, may be sued.

GlobalEdit's GlobalEdit™ software is an online collaboration tool for approving photos. While it enables aspects of the above process to be performed online, it still leaves room for error by requiring the publisher to approve or reject photos just prior to publication.

SUMMARY

In one embodiment of this disclosure, a computer-implemented method includes identifying one or more subjects appearing in an image captured by a mobile device. One or more approval statuses are determined. An approval status of the one or more approval statuses is associated with each of the one or more subjects appearing in the image. Determining the one or more approval statuses includes searching, by a computer processor of the mobile device, within stored data for a blanket approval status applicable to the image for each subject in the image. A blanket approval status specifies an approval status to be applied for images captured in certain circumstances. The one or more approval statuses of the one or more subjects are displaying in association with the image, on the mobile device. It is determined whether the image is approved for publication based on the one or more approval statuses of the one or more subjects in the image.

In another embodiment, a system includes a memory and one or more processors communicatively coupled to the memory. The one or more processors are configured to identify one or more subjects appearing in an image captured by a mobile device. The one or more processors are further configured to determine one or more approval statuses, and associate an approval status of the one or more approval statuses with each of the one or more subjects appearing in the image. To determine the one or more approval statuses, the one or more processors are configured to search within stored data for a blanket approval status applicable to the image for each subject in the image. A blanket approval status specifies an approval status to be applied for images captured in certain circumstances. The one or more processors are further configured to display in association with the image, on the mobile device, the one or more approval statuses of the one or more subjects. The one or more processors are further configured to determine whether the image is approved for publication based on the one or more approval statuses of the one or more subjects in the image.

In yet another embodiment, a computer program product for approving images for publication includes a computer readable storage medium having program instructions embodied therewith. The program instructions are executable by a processor to cause the processor to perform a method. The method includes identifying one or more subjects appearing in an image captured by a mobile device. Further according to the method, one or more approval statuses are determined. An approval status of the one or more approval statuses is associated with each of the one or more subjects appearing in the image. Determining the one or more approval statuses includes searching, by a computer processor of the mobile device, within stored data for a blanket approval status applicable to the image for each subject in the image. A blanket approval status specifies an approval status to be applied for images captured in certain circumstances. The one or more approval statuses of the one or more subjects are displaying in association with the image, on the mobile device. It is determined whether the image is approved for publication based on the one or more approval statuses of the one or more subjects in the image.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure are approval systems and methods enabling a photographer or other user to efficiently acquire publication approvals and rejections of assets, specifically images, such as photos and videos. Although the embodiments below refer specifically to approval of images, it will be understood that some embodiments may be used to facilitate approval of other assets, for example, approval by authors for publication of copyrighted works.

Figure 1:
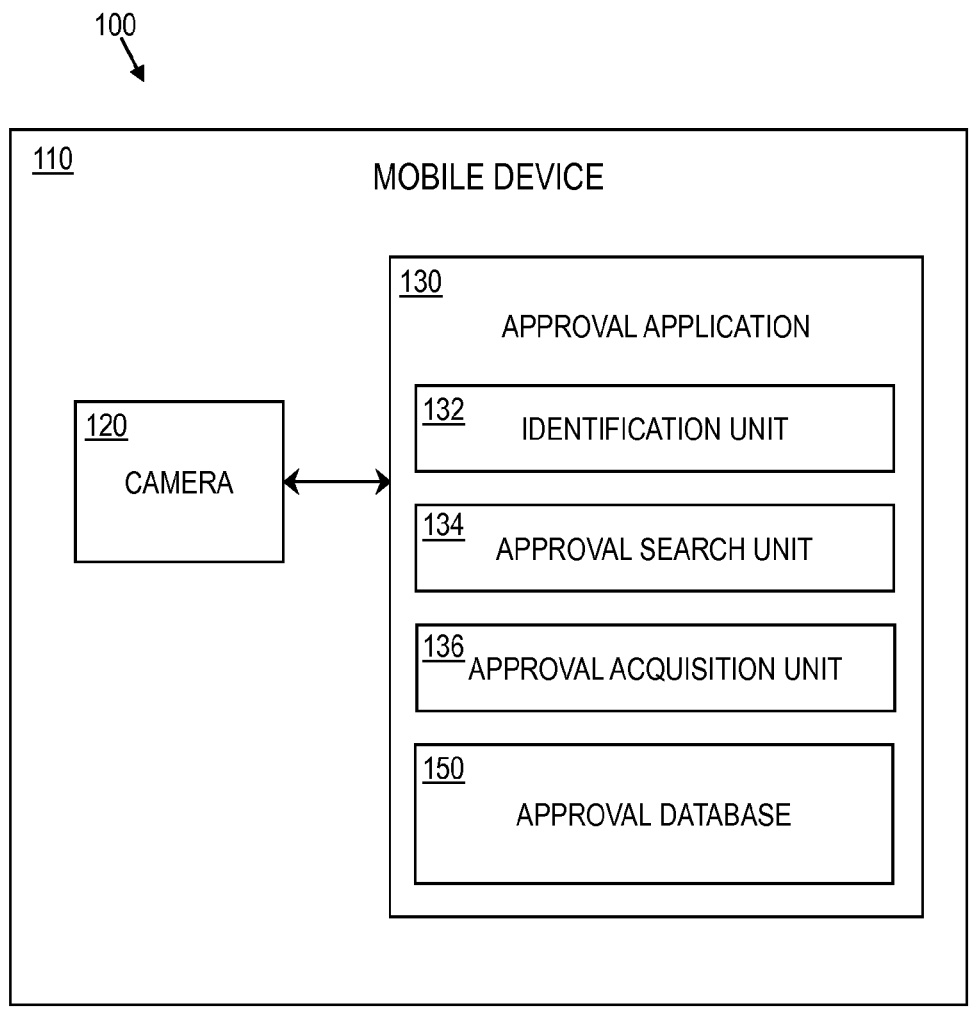
FIG. 1 is a first block diagram of an approval system, according to an embodiment of this disclosure.

FIG. 1 is a first block diagram of an approval system 100, according to an embodiment of this disclosure. As shown, the approval system may be embodied, in whole or in part, in a mobile device 110, such as, for example, a smartphone, tablet, smart camera, or notebook computer. The mobile device 110 may include or be associated with (e.g., communicatively coupled to) a camera 120 or other image-capture device for capturing one or more images for which publication approval is desired. The mobile device 110 may further include an approval application 130 incorporating some or all aspects of the approval system 100. In some embodiments, the approval application 130 may have access to the camera 120 and may provide instructions to the camera for capturing images. The approval application 130 may provide a collection of functions, including, for example, facial recognition, approval search, and approval acquisition, which may be performed by a identification unit 132, an approval search unit 134, and an approval acquisition unit 136, respectively. These units may be part of, or in communication with, the approval application 130 and may be implemented in hardware, software, or a combination thereof.

A user may use the camera 120 to capture an image, e.g., a photo or a video, of one or more subjects, which may be people appearing in the image. Approval may thus be required by each subject before the image can be published.

The approval system 100 may display the captured image along with an approval status for each subject in the image. In some embodiments, the approval system 100 may use facial recognition to identify which areas of the image represent faces and to identify those faces. In some embodiments, this facial recognition may be performed by the identification unit 132. After a face is identified as a particular person, the approval system 100 may determine whether that person has previously provided any existing blanket approval statuses, such as a blanket approval, rejection, or deferral. In some embodiments, this may be achieved by searching stored data in an approval database 150. The approval database 150 may be located on the mobile device 110 or remotely, such as on a remote server, and therefore shared across mobile devices 110 running separate instances of the approval application 130. In some further embodiments, the search of the approval database 150 may be performed by the approval search unit 134. It will be understood that, although the term database is used herein, this disclosure is not limited to relational databases. Rather, various mechanisms for maintaining data may be used for the approval database 150 in place of or in addition to a relational database.

In some instances, a person may have previously supplied a blanket approval status, such as a blanket approval, rejection, or deferral. A blanket approval may approve all future images or some certain future images meeting certain criteria; a blanket rejection may reject all future images or certain future images meeting certain criteria; and a blanket deferral may require that updating of the approval status from undetermined may be deferred for all future images or certain future images meeting certain criteria. Each blanket approval status may be general or specific, where a specific blanket approval status is associated with a set of criteria determining whether the blanket approval status applies. A general blanket approval status may apply to all future images; in other words, all circumstances meet the criteria for that approval status. In contrast, a specific blanket approval status may apply only under certain circumstances. The criteria associated with a blanket approval status may be based on, for example, event, location, time, or image or asset type (e.g., photo versus video). For example, a subject may have previously issued a blanket rejection for all images taken at a specific event. Thus, that particular blanket rejection applies only at the specific event, and other approval statuses may apply in other circumstances.

If the approval system 100 determines that a subject of the image has provided a blanket approval applying to the image, the approval system 100 may automatically set the subject's approval status for the image to "approved" or the like. If the approval system 100 determines that the subject of the image has provided a blanket rejection that applies to the image, the approval system 100 may automatically set the subject's approval status in the image to "rejected" or the like. If the approval system 100 determines that the subject of the image has provided a blanket deferral that applies to the image, the approval system 100 may automatically set the subject's approval status in the image to "deferred" or the like. If, however, it is determined that no previously made blanket approval status for the subject applies to the image, the approval system 100 may set the subject's approval status to undetermined. Additionally, in some cases, the approval system 100 may be unable to identify a subject using facial recognition. In that case, the approval system 100 may automatically set that subject's approval status to undetermined. The approval system 100 may apply the above inquiry, i.e., determining whether an existing blanket approval status applies, to each subject identified in the image. It will be understood that the terms used for approval statuses herein (e.g., approved, rejected, deferred, undetermined) are illustrative only, and that alternative terms or indications may be used by the approval system 100 to represent these statuses.

In association with the image (e.g., within the image, as displayed on the mobile device 110; outside the border of the image or alongside the image; or easily accessible from the image), the approval system 100 may indicate the approval status of each subject of the image. For example, and not by way of limitation, the approval system 100 may provide a box outlining or otherwise emphasizing the face of each subject and may indicate near each box the approval status of the subject in question.

Figure 2:
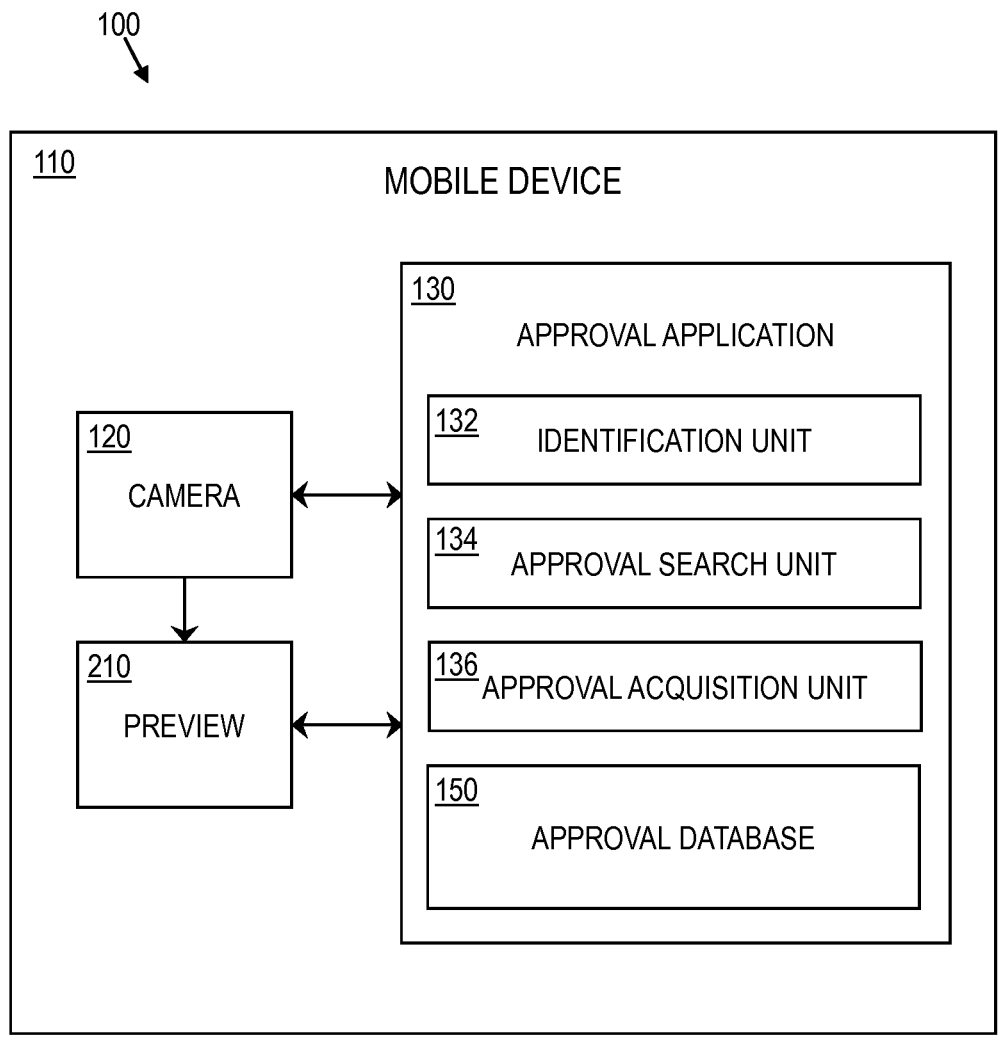
FIG. 2 represents a second block diagram of the approval system, according to another embodiment of this disclosure.

FIG. 2 represents a second block diagram of the approval system, according to another embodiment of this disclosure. As shown in FIG. 2, in some embodiments, the approval system 100 may provide indication of the subjects' approval statuses even before the image is captured. For instance, the camera 120 may be capable of providing a preview 210 of an image before capturing the image, and the approval system 100 may access the preview 210. For example, in some embodiments, the preview 210 may be displayed within the approval application 130. The approval system 110 may display the approval statuses of the subjects appearing in the preview 210, in a manner the same or similar to the manner in which such statuses may be displayed for a captured image, as discussed above. A benefit of providing these approval statuses in the preview 210, before capturing the image, is that the user may be aware of the approval statuses before capturing the image. For instance, the user may see that a particular subject has provided a blanket rejection of publication for all images in which he appears. In that case, a photographer may opt not to capture the previewed image.

In some embodiments, the approval system 100 may enable the use to indicate settings used by the approval system 100. These settings may determine, for example, whether approval statuses are provided in image previews; the manner of acquiring approvals (e.g., signature, check box, etc.); whether published images or notifications of such are sent to the user, the subjects, or both (e.g., via email, text message, or social-network tagging); or other options used by the approval system 100.

For each subject whose approval status is undetermined, the approval system 100 may be configured to receive an updated or changed approval status (e.g., an approval, rejection, or deferral). In some embodiments, this updated approval status may be acquired by the approval acquisition unit 136. Each subject appearing in the image may be selectable for the purpose of providing an updating approval status. For example, the approval system 100 may cycle through each subject whose approval status is undetermined, selecting each subject one at a time and enabling the user to act on that approval status. For another example, the approval system 100 may enable the user to manually select a subject with an undetermined approval status, as displayed in association with the image, and act on that approval status.

When a subject with an undetermined approval is selected, the approval system 100 may acquire an updated approval status for that subject. The photographer can pass the mobile device 110 to the subject, and the approval system 100 may enable the subject to indicate a desired approval status (e.g., approved, rejected, deferred) for the image.

In some embodiments, the manner of acquiring an updated approval status may be determined, at least in part, by default settings or settings provided by the user. For example, and not by way of limitation, the approval system 100 may be configured to capture an image of a signature, and may thus enable the subject to sign to indicate approval or rejection. For instance, the subject may be enabled to virtually sign a touchscreen of the mobile device 110. For another example, the approval system 100 may enable the subject or the photographer to simply select between the various approval status options, e.g., approval, rejection, and deferral. In this case, the photographer can update the approval status on behalf of the subject, which may be useful if, for example, the subject gives only verbal approval or gives approval by some mechanism outside the approval system 100.

In some embodiments, the approval system 100 may be further enabled to accept blanket approval statuses from subjects. In that case, the approval system 100 may present the subject with options for the following, for example: approval or rejection of the current image; deferral of approval or rejection; or blanket approval, rejection, or deferral for the present and future images. After an updated approval status is received for a subject, that subject's approval status for the image may then be changed to that received approval status, which may be displayed in association with the image.

If a blanket approval status is received, the approval system 100 may store that blanket approval status in the approval database 150 to be used for future images. In some embodiments, if approval status is received for a subject whose identity is not known by the approval system 100, the approval system 100 may update the approval database 150 with that subject's identity, including, for example, providing data to facilitate future facial recognition. This updated data may include, for example, the existence of any blanket approval statuses acquired.

As described above, an image may thus include representations of various subjects, each with associated approval statuses, which may vary from subject to subject. When the user is done updating approval statuses as needed, the user may indicate such to the approval system 100, which may save the current set of approval statuses and associate these approval statuses with the image. If all subjects have approved the image (i.e., have approval statuses indicating approval), the image may be approved for publication, and the approval system 100 may mark the image as approved. However, if one or more subjects have not approved the image, in some embodiments, the image is not yet approved for publication.

In some embodiments, a deferral approval status may be an indication that the subject wishes to indicate an approval status for the image at a later time. A deferral may be useful, for example, to enable a subject to review legal text related to approvals, to review images more closely, or to give a more thoughtful per-image approval or rejection. If the image includes one or more deferrals, in some embodiments, the approval system 100 may initiate acquiring approvals to be received at a later time. For example, and not by way of limitation, the approval system 100 may automatically send an email or other notification to each subject having a deferred approval status. That email may include a copy of the image and may provide instructions to the subject for updating the subject's approval status with respect to the image. In some embodiments, the email may also enable the subject to provide one or more blanket approval statuses for use in the future.

In some embodiments, the approval system 100 may be configured to hide the identity of some or all subjects who have not approved, or have rejected, publication of the image. For example, and not by way of limitation, the approval system 100 may blur, crop, or otherwise obscure the face or other identifying aspect of each such a subject. After a subject's face or other identifying aspects are obscured, the approval system 100 may then deem the subject to be hidden and no longer identifiable in the image, such that an approval from that subject is no longer needed for publication of the image. When the identities of all non-approving subjects are hidden, the approval system 100 may mark the image as approved. It will be understood that the determination of whether an identity of a subject is hidden may vary between embodiments. Some embodiments may deem a subject to be hidden if that subject's face is obscured, while other embodiments may require that the entire body or all identifying marks are obscured as well. If one or more subjects whose identities are not hidden have not approved the image, then the approval system 100 may mark the image as rejected or not approved. It will be understood, however, that if one or more subjects have deferred approval statuses, an image's status may later change from not approved to approved if the required approvals are received in the future. It will also be understood that if one or more subjects have deferred approval statuses, they may be obscured in the image until approval is received, at which time the obscuring may be undone.

Marking an image as approved or not approved may be performed by various mechanisms. For example, this may include one or more of the following: providing metadata associated with the image; sending an email or other notification indicating which images are approved; or simply alerting the user of each image's overall approval status. For another example, in some embodiments, the approval system 100 may apply protection to the image, disabling transfer of the image to other devices or disabling viewing of the image on other devices, such as on web pages. In some embodiments, the manner of marking an image may be based on settings modifiable by the user.

Figure 3:
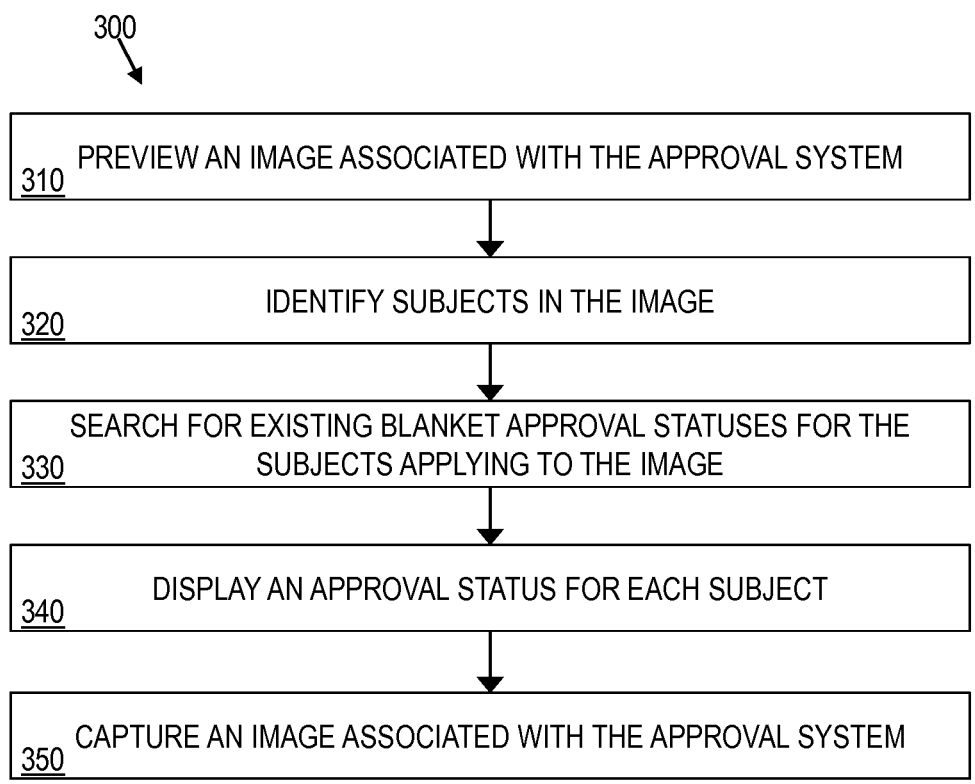
FIG. 3 is block diagram of a method for showing approval statuses for image previews, according to some embodiments of this disclosure.

FIG. 3 is block diagram of a method 300 for showing approval statuses for image previews, according to some embodiments of this disclosure. As shown, at block 310, an image may be previewed in real time, prior to being captured, and associated with the approval system 100. At block 320, the approval system 100 may identify the subjects in the preview. This may occur by facial recognition, for example. At block 330, the approval system 100 may search for existing blanket approval statuses for the identified subjects and apply them as needed. At block 340, the approval system may display an approval status for each subject in the preview. At block 350, an image may be captured and associated with the approval system 100, where the image is the one having been previewed.

Figure 4:
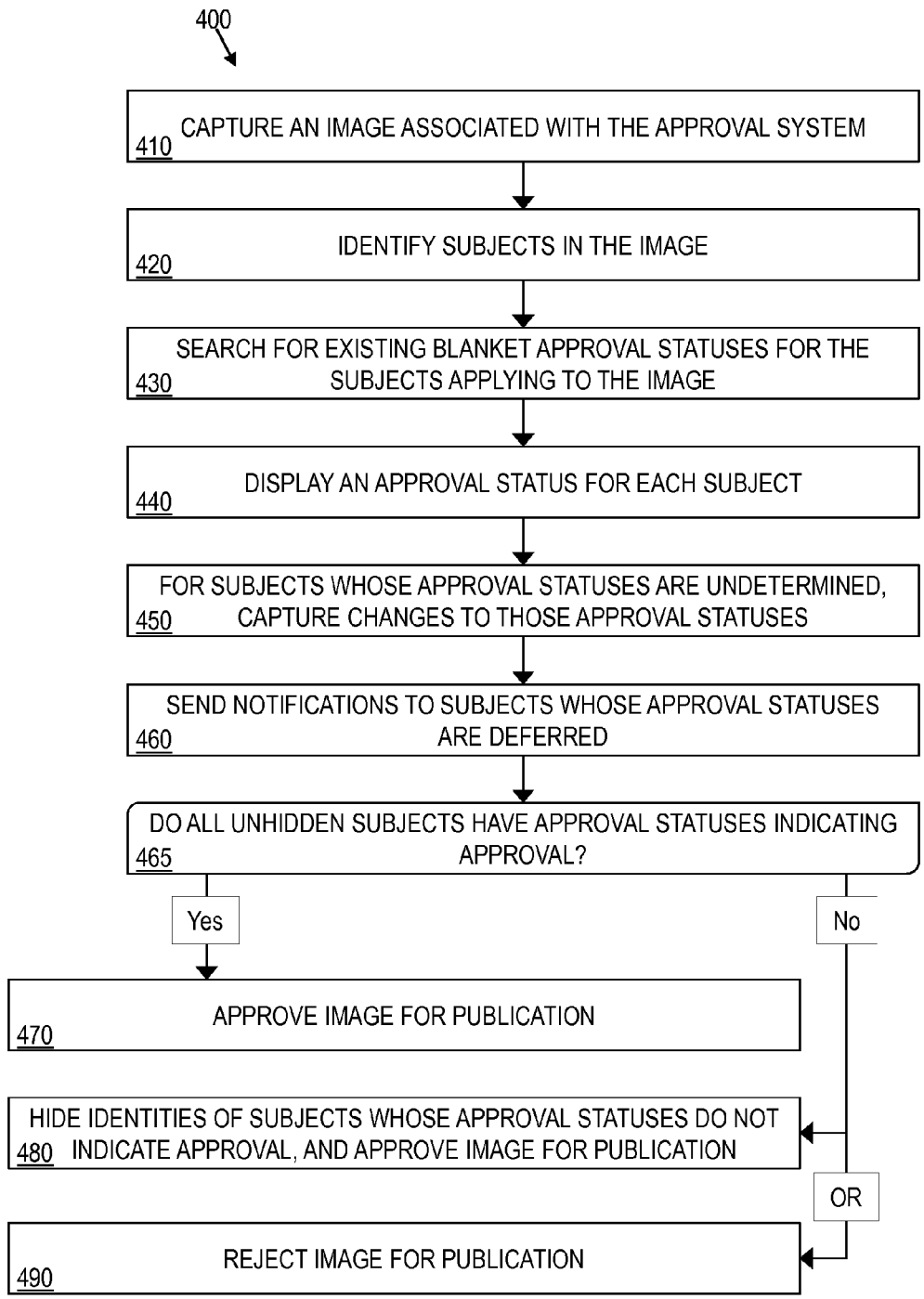
FIG. 4 is a flow diagram of a method of approving images, according to some embodiments of this disclosure.

FIG. 4 is a flow diagram of a method of approving images, according to some embodiments of this disclosure. As shown, at block 410, an image may be captured and associated with the approval system 100. In some embodiments, the blocks of FIG. 4 may continue from those of FIG. 3, and thus blocks 350 and 410 may be the same. At block 420, the approval system 100 may identify the subjects in the image. This may occur by facial recognition. At block 430, the approval system 100 may search for existing blanket approval statuses for the identified subjects and apply them as needed. In some embodiments, the approval system 100 may have already previewed the image and performed blocks 320 and 330, i.e., identifying subjects and searching for existing blanket approvals, for the image preview. In that case, if it is determined that the image displays the same subjects as shown in the preview for which blocks 320 and 330 were already performed, the approval system 100 may skip blocks 420 and 430. At block 440, the approval system may display an approval status for each subject in the image. At block 450, the approval system 100 may capture changes to approval statuses for subjects whose approval statuses are undetermined. At block 460, the approval system 100 may send notifications to subjects whose approval statuses are deferred, where those notifications may include instructions for changing the approval statuses. At decision block 465, it may be determined whether only subjects whose approval statuses indicate approval remain unhidden in the image. If this is the case, then at block 470, the image may be approved for publication. If one or more unhidden subjects have approval statuses not indicating approval, then at block 480, the identity of those subjects with approval statuses not indicating approval may be hidden and the image may be approved; or at block 490, the image may be rejected for publication.

Figure 5:
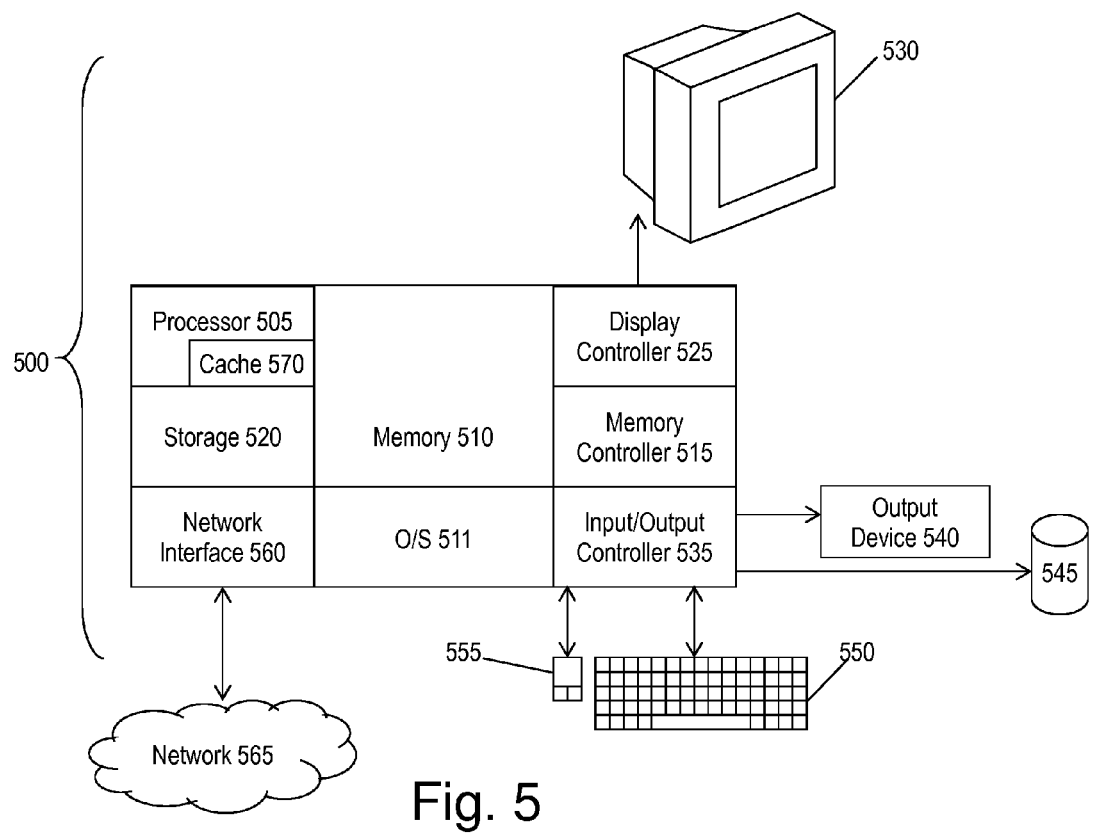
FIG. 5 is a block diagram of a computing device for implementing some or all aspects of the approval system, according to some embodiments of this disclosure.

FIG. 5 illustrates a block diagram of a computer system 500 for use in implementing an approval system 100 or method according to some embodiments. This computer system 100 may be, for example, a mobile device 110 such as that shown in FIG. 1. The approval systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 500, such as a personal computer, workstation, minicomputer, or mainframe computer.

In an exemplary embodiment, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. A conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be any custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the approval systems and methods of this disclosure.

The computer system 500 may further include a display controller 525 coupled to a display 530. In an exemplary embodiment, the computer system 500 may further include a network interface 560 for coupling to a network 565. The network 565 may be an IP-based network for communication between the computer system 500 and any external server, client and the like via a broadband connection. The network 565 transmits and receives data between the computer system 500 and external systems. In an exemplary embodiment, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Approval systems and methods according to this disclosure may be embodied, in whole or in part, in computer program products or in computer systems 500, such as that illustrated in FIG. 5.

For some embodiments of this disclosure, technical effects and benefits include providing real-time approval statuses to alert a photographer or other entity of whether an image may be published. Thus, as a result of using the approval system 100 disclosed herein, a photographer may have significantly less work to do compared to manually tracking approvals. Further, the photographer may gain confidence, when posting images, that all the required approvals were obtained.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   displaying an image preview of an image before capturing the image with a camera, the camera residing on a mobile device, wherein the image preview illustrates how the image will appear when captured by the camera;
   identifying one or more subjects appearing in the image preview;
   determining one or more approval statuses, and associating an approval status of the one or more approval statuses with each of the one or more subjects appearing in the image preview, wherein determining the one or more approval statuses comprises:
      searching, by a computer processor of the mobile device, within stored data for a blanket approval status applicable to the image preview for each subject in the image preview, wherein a blanket approval status specifies an approval status to be applied for images captured in certain circumstances;
   displaying in association with the image preview, on the mobile device, the one or more approval statuses of the one or more subjects;
   capturing, by the camera of the mobile device, the image, wherein the one or more subjects appear in the image;
   determining that a first approval status associated with a first subject, of the one or more subjects appearing in the image, is undetermined;
   capturing, by the mobile device, a virtual signature of the first subject, the virtual signature confirming an updated approval status of the first subject; and
   determining whether the image is approved for publication based on the one or more approval statuses of the one or more subjects in the image, the one or more approval statuses comprising at least the updated approval status of the first subject.

2. The method of claim 1, wherein identifying the one or more subjects appearing in the image preview is performed by facial recognition.

3. The method of claim 1, further comprising:
   displaying in association with the image, on the mobile device, the updated approval status of the first subject with respect to the image.

4. The method of claim 1, further comprising, in response to the first subject having an approval status indicating deferral, automatically providing instructions to the first subject for changing the approval status associated with the first subject at a later time.

5. The method of claim 1, further comprising obscuring at least a portion of the first subject in the image in response to the approval status associated with the first subject not indicating approval of the image for publication.

6. The method of claim 1, further comprising approving the image for publication in response to all unhidden subjects that appear in the image being associated with approval statuses indicating approval of the image for publication.

7. The method of claim 1, further comprising disallowing publication in response to at least one unhidden subject in the image not being associated with an approval status indicating approval of the image for publication.

8. A system comprising:
   a memory; and
   one or more processors, communicatively coupled to the memory, the one or more processors configured to:
      display an image preview of an image before capturing the image with a camera, the camera residing on a mobile device, wherein the image preview illustrates how the image will appear when captured by the camera;
      identify one or more subjects appearing in the image preview;
      determine one or more approval statuses, and associate an approval status of the one or more approval statuses with each of the one or more subjects appearing in the image preview, wherein, to determine the one or more approval statuses, the one or more processors are configured to:
         search within stored data for a blanket approval status applicable to the image preview for each subject in the image preview, wherein a blanket approval status specifies an approval status to be applied for images captured in certain circumstances;
      display in association with the image preview, on the mobile device, the one or more approval statuses of the one or more subjects;
      capture, by the camera of the mobile device, the image, wherein the one or more subjects appear in the image;
      determine that a first approval status associated with a first subject, of the one or more subjects appearing in the image, is undetermined;
      capture, by the mobile device, a virtual signature of the first subject, the virtual signature confirming an updated approval status of the first subject; and
      determine whether the image is approved for publication based on the one or more approval statuses of the one or more subjects in the image, the one or more approval statuses comprising at least the updated approval status of the first subject.

9. The system of claim 1, wherein the one or more processors are further configured to use facial recognition to identify the one or more subjects appearing in the image preview.

10. The system of claim 1, wherein the one or more processors are further configured to:
display in association with the image, on the mobile device, the updated approval status of the first subject with respect to the image.

11. The system of claim 1, wherein, in response to the first subject having an approval status indicating deferral, the one or more processors are further configured to automatically provide instructions to the first subject for changing the approval status associated with the first subject at a later time.

12. The system of claim 1, wherein the one or more processors are further configured to obscure at least a portion of the first subject in the image in response to the approval status associated with the first subject not indicating approval of the image for publication.

13. The system of claim 1, wherein the one or more processors are further configured to approve the image for publication when all unhidden subjects appearing in the image are associated with approval statuses indicating approval of the image for publication.

14. The system of claim 1, wherein the one or more processors are further configured to disallow publication in response to at least one unhidden subject in the image not being associated with an approval status indicating approval of the image for publication.

15. A computer program product for approving images for publication, the computer program product comprising a non-transitory computer readable storage medium having program instructions embodied therewith, the program instructions executable by a processor to cause the processor to perform a method comprising:
displaying an image preview of an image before capturing the image with a camera, the camera residing on a mobile device, wherein the image preview illustrates how the image will appear when captured by the camera;
identifying one or more subjects appearing in the image preview;
determining one or more approval statuses, and associating an approval status of the one or more approval statuses with each of the one or more subjects appearing in the image preview, wherein determining the one or more approval statuses comprises:
searching within stored data for a blanket approval status applicable to the image preview for each subject in the image preview, wherein a blanket approval status specifies an approval status to be applied for images captured in certain circumstances;
displaying in association with the image preview, on the mobile device, the one or more approval statuses of the one or more subjects;
capturing, by the camera of the mobile device, the image, wherein the one or more subjects appear in the image;
determining that a first approval status associated with a first subject, of the one or more subjects appearing in the image, is undetermined;
capturing, by the mobile device, a virtual signature of the first subject, the virtual signature confirming an updated approval status of the first subject; and
determining whether the image is approved for publication based on the one or more approval statuses of the one or more subjects in the image, the one or more approval statuses comprising at least the updated approval status of the first subject.

16. The computer program product of claim 1, wherein identifying the one or more subjects appearing in the image preview is performed by facial recognition.

17. The computer program product of claim 1, the method further comprising:
displaying in association with the image, on the mobile device, the updated approval status of the first subject with respect to the image.

18. The computer program product of claim 1, the method further comprising, in response to the first subject having an approval status indicating deferral, automatically providing instructions to the first subject for changing the approval status associated with the first subject at a later time.

19. The computer program product of claim 1, the method further comprising obscuring at least a portion of the first subject in the image in response to the approval status associated with the first subject not indicating approval of the image for publication.

20. The computer program product of claim 1, the method further comprising:
approving the image for publication when all unhidden subjects appearing in the image are associated with approval statuses indicating approval of the image for publication; and
disallowing publication in response to at least one unhidden subject in the image not being associated with an approval status indicating approval of the image for publication.

* * * * *